United States Patent [19]
Grinstead

[11] Patent Number: 4,808,385
[45] Date of Patent: Feb. 28, 1989

[54] PROCESS FOR THE REMOVAL OF H₂S FROM FLUID STREAMS USING A WATER SOLUBLE POLYMERIC CHELATE OF AN OXIDIZING POLYVALENT METAL

[75] Inventor: Robert R. Grinstead, Walnut Creek, Calif.

[73] Assignee: The Dow Chemical Company, Midland, Mich.

[21] Appl. No.: 15,906

[22] Filed: Feb. 18, 1987

Related U.S. Application Data

[63] Continuation-in-part of Ser. No. 837,926, Mar. 10, 1986.

[51] Int. Cl.⁴ .................... C01B 17/16; C01B 31/20; C01B 11/02
[52] U.S. Cl. ............................. 423/226; 423/227; 423/228; 423/513 R; 423/573.1
[58] Field of Search ............ 423/226, 227, 228, 573 R

[56] References Cited

U.S. PATENT DOCUMENTS

| | | | |
|---|---|---|---|
| 4,002,727 | 1/1977 | Sonoda et al. | 423/573 R |
| 4,483,843 | 11/1984 | Sonoda et al. | 423/226 |
| 4,518,577 | 5/1985 | Klecka | 423/573 R |
| 4,525,338 | 6/1985 | Klee | 423/226 |
| 4,683,076 | 7/1987 | Lampton, Jr. et al. | 423/228 |

OTHER PUBLICATIONS

Chemical Engineering, Membrane Separation Processes, Jun. 14, 1984, vol. 91, No. 12 pp. 77,84.
Hackh's Chemical Dictionary, Fourth Edition, Jan. 1986 p. 138.
Kirk–Othmer Encyclopedia of Chemical Technology 3rd edition vol. 5 pp. 16–18 and 55–61.

*Primary Examiner*—John Doll
*Assistant Examiner*—Lori S. Freeman
*Attorney, Agent, or Firm*—Norman L. Sims

[57] ABSTRACT

The present invention relates to a cyclic continuous process and a composition for the removal of hydrogen sulfide from a variety of sour gas streams. The sour gas stream is contacted with an aqueous solution of a water-soluble organic polymeric chelate containing an oxidizing polyvalent metal, e.g., Fe(III). The sulfur in the hydrogen sulfide is converted to elemental sulfur and the iron in the polymeric chelate is reduced. The process includes removal of the elemental sulfur, and an inexpensive method for removing water and excess low molecular weight materials, e.g., materials having molecular weights below 500, preferably using ultrafiltration or dialysis, regeneration and recycle of the reactive polyvalent metal.

7 Claims, 3 Drawing Sheets

FIGURE 1
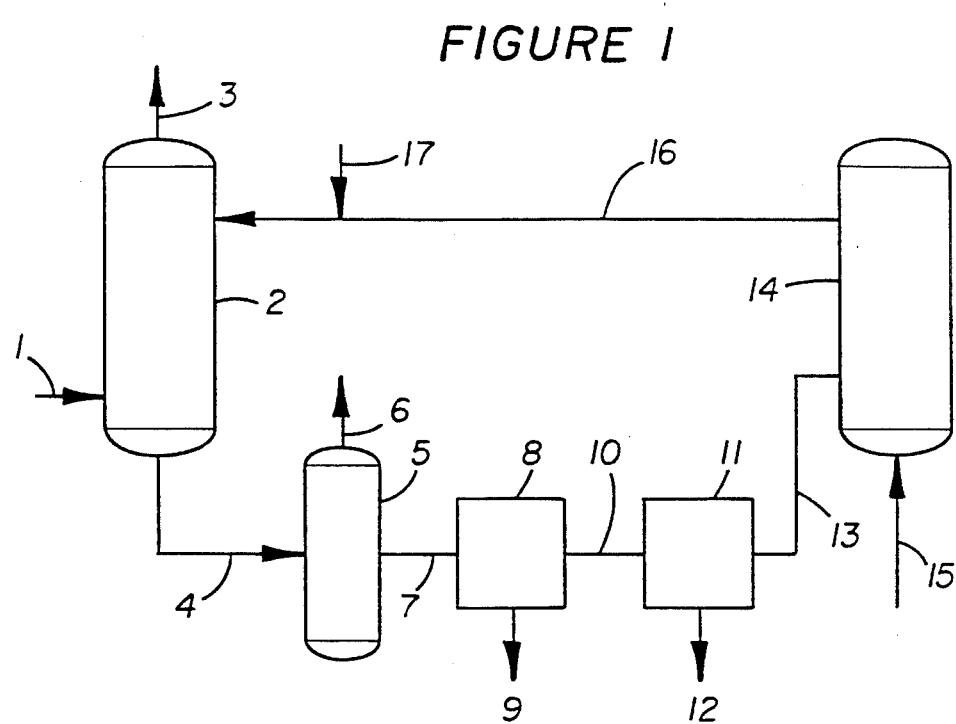
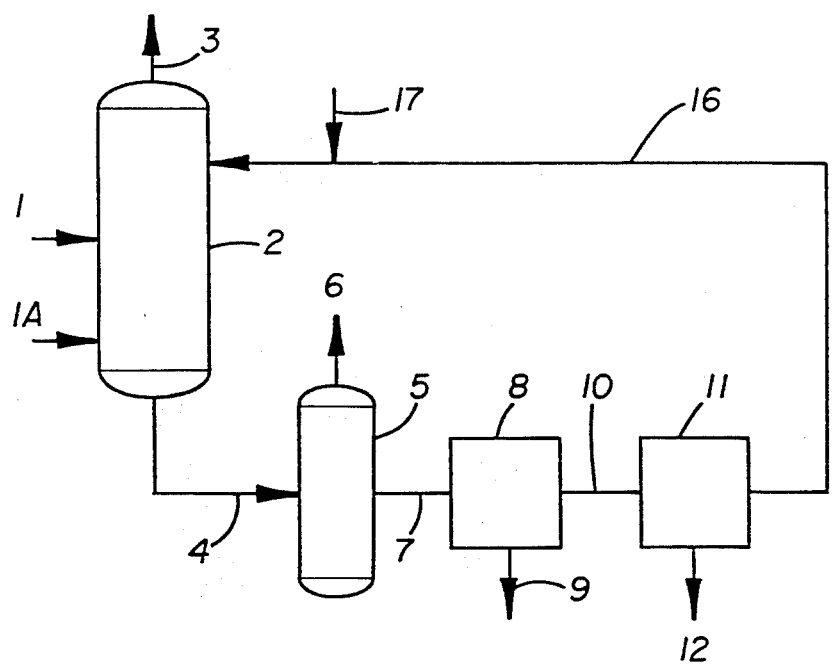
FIGURE 2

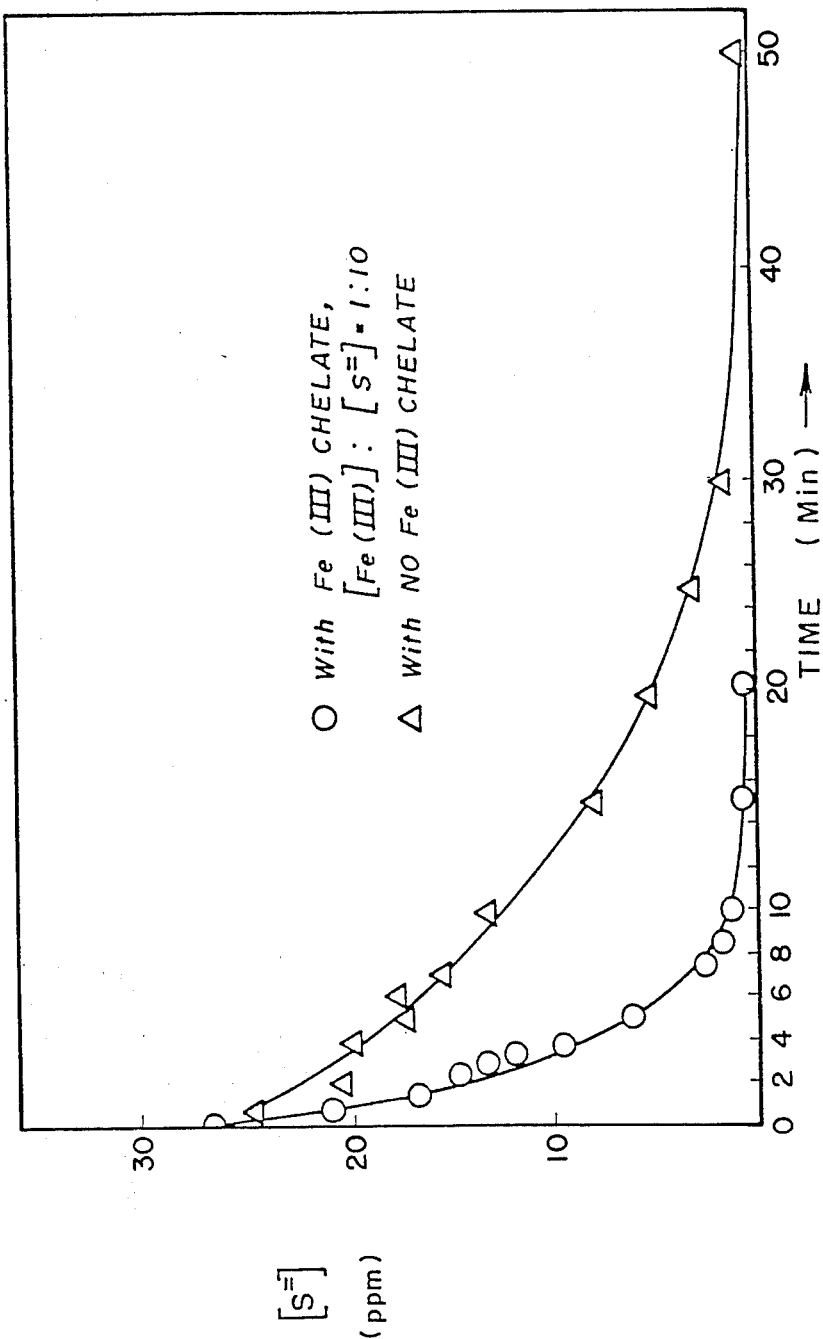

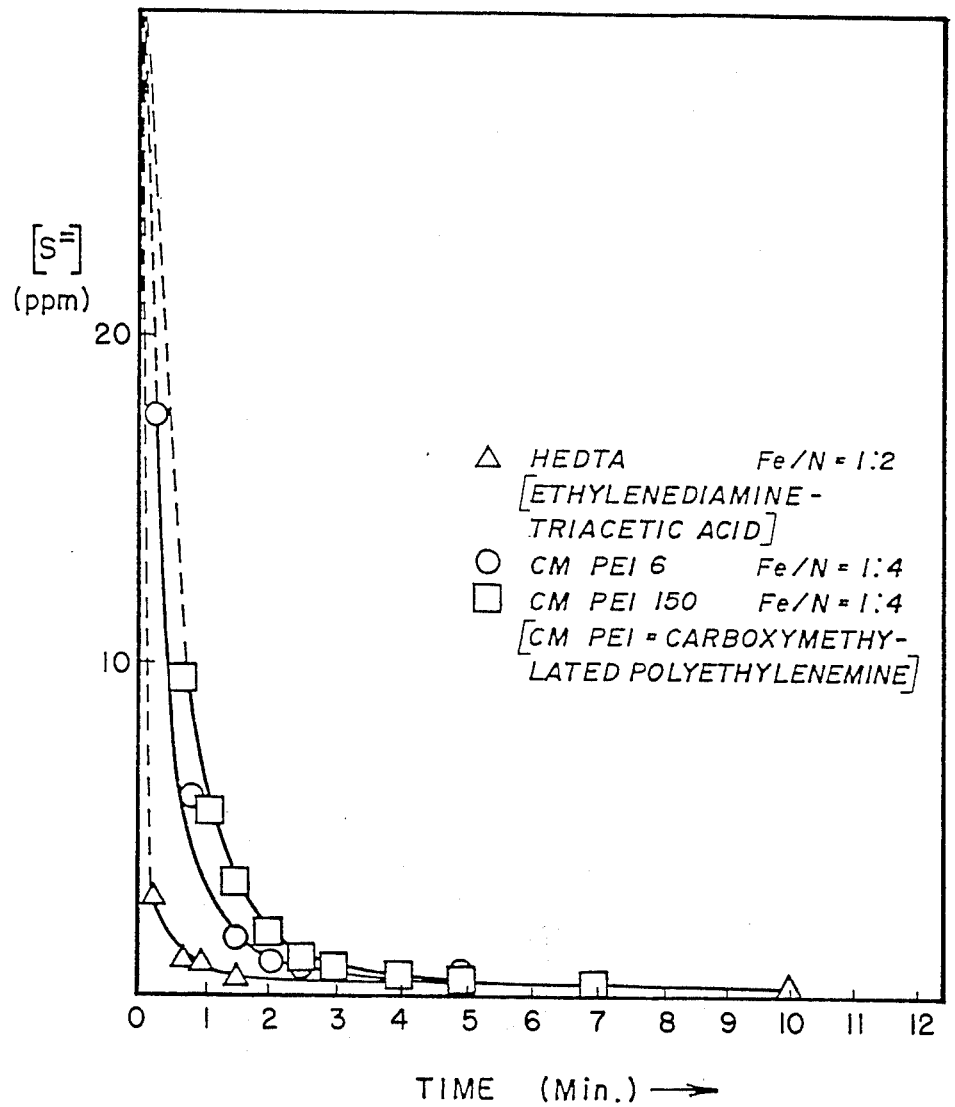

PROCESS FOR THE REMOVAL OF H2S FROM FLUID STREAMS USING A WATER SOLUBLE POLYMERIC CHELATE OF AN OXIDIZING POLYVALENT METAL

ORIGIN OF THE INVENTION

This application is a continuation-in-part of U.S. patent application Ser. No. 837,926, by the same inventor filed on Mar. 10, 1986. The entire disclosure of this pending application is incorporated herein by reference.

BACKGROUND OF THE INVENTION

1. Field of the Invention

This invention relates to a process wherein a fluid stream comprising a noxious gas, i.e., hydrogen sulfide ($H_2S$), is treated with a water-soluble polymeric chelate of a polyvalent metal to oxidize the $H_2S$, i.e., the sulfur contained in the $H_2S$, to elemental sulfur. The elemental sulfur is separated and the polymeric chelate of the reduced metal in the aqueous solution is concentrated by means, such as dialysis or ultrafiltration. The polyvalent metal chelate is then oxidized and recycled. More specifically, the present invention relates to a process of removing $H_2S$ from a gas stream using an aqueous solution of a water-soluble polymeric chelate of iron in the $Fe^{+3}$ state, separating the elemental sulfur, concentrating the aqueous solution of the chelate of divalent iron using ultrafiltration or dialysis, oxidizing the $Fe^{+2}$ to $Fe^{+3}$, and recycling the polymeric chelate.

2. Relevant Art

It has been reported in U.S. Pat. No. 4,123,506 and in U.S. Pat. No. 4,202,864 that geothermal steam containing $H_2S$ can be purified by contacting the steam with a metal compound that forms insoluble metallic sulfides. The subsequent disposal of the metallic sulfides is expensive and time consuming.

In U.S. Pat. Nos. 4,414,817 and 4,468,929, R. T. Jernigan discloses the treatment of geothermal steam by condensing it with an aqueous solution of a monomeric ferric chelate, such as N-hydroxyethylenediamine triacetic acid. The hydrogen sulfide is converted to elemental sulfur and the ferric chelate is reduced to ferrous chelate. The ferrous-monomeric chelate is subsequently oxidized to monomeric ferric chelate and re-cycled.

Z. Diaz in U.S. Pat. No. 4,400,368 discloses a cyclic process for the removal of hydrogen sulfide and carbon dioxide from a variety of gas streams. The "sour gas" stream containing these acidic gases is contacted with an aqueous solution of specific monomeric ligands or chelates of polyvalent metals or mixtures thereof. Hydrogen sulfide is oxidized to elemental sulfur, and the reactive metal monomeric chelate is reduced. The process includes sulfur removal and regeneration of the reactive metal chelate. Further, no provision is disclosed for removal of low molecular weight products or water from the process.

R. B. Thompson in U.S. Pat. Nos. 4,189,462 and 4,218,342 discloses a composition for use in an oxidation-reduction process for effecting the catalytic oxidation of hydrogen sulfide gas comprising a monomeric soluble ferric ion salt. This reference does not disclose a process using organic polymeric chelates of iron.

F. Engelhardt et al. in U.S. Pat. No. 4,518,745 disclose a number of metal chelates of water-soluble copolymers. The copolymers are useful as dyestuff auxiliaries and leather retanning agents.

M. E. Klecka in U.S. Pat. No. 4,518,577 discloses a process for the removal of $H_2S$ from a sour gas stream. The $H_2S$ is oxidized using aqueous solutions of oxidizing polyvalent metal chelates of specified monomeric organic acids and by the separation and recovery of the sulfur from solutions of specific organic extractants.

Z. Diaz in U.S. Pat. No. 4,518,576 discloses a cyclic process for the removal of hydrogen sulfide from a variety of gas streams. The sour gas stream is contacted with an aqueous solution of a monomeric chelate of iron (III) and a combination of a crystal modifier of phosphate and thiosulfate ions. The $H_2S$ is oxidized to elemental sulfur and the thiosulfate reactant is reduced. The process includes sulfur removal and regeneration and recycle of the reactant.

C. A. Lieder et al. in U.S. Pat. No. 4,332,781 disclose a process for the removal of hydrogen sulfide and carbonyl sulfide from a gas stream in a staged procedure characterized by conversion of the hydrogen sulfide to produce sulfur in aqueous solution or suspension. The reactant materials include polyvalent metals bound to monomeric chelates.

J. O. Porath in U.S. Pat. No. 4,423,158 discloses introducing a chelate-forming group into a polymer such as polystyrene. There is obtained an adsorbant for bivalent or multivalent metal ions which are useful in ion exchange chromatography. The patent does not disclose the use of water-soluble polymeric chelates or the process of the present invention which are employed to remove $H_2S$ from fluid streams with recovery of the polymeric chelate and active metal ion.

Additional art of interest includes, for example, U.S. Pat. No. 4,400,361.

Thus, several techniques are known for treating the exhaust stream from a geothermal steam well, or the sour gas or sour water from a refinery process with a monomeric organic chelate of iron (III). A problem with these processes is that the efficient separation of excess water, products and by-products which accumulate in the processes from the monomeric organic chelate of iron (II) or iron (III) from the aqueous stream is usually difficult and very costly. A portion of the expensive iron-monomeric organic chelate is lost during separation of water and the low molecular weight materials, and cannot be recovered. It is therefore highly desirable to have a process where the expensive organic iron (III) or iron (II) polymeric chelate can be separated easily from a waste stream originally containing $H_2S$, and recycled again and again. This invention provides such an improved process and a water-soluble polymeric composition for use in the process.

SUMMARY OF THE INVENTION

The present invention relates to a process for the removal of $H_2S$ from a fluid stream comprising $H_2S$, which process comprises:

(A) contacting the fluid stream in a contacting zone with an aqueous reaction solution at a temperature between about 10° and 90° C. for a time effective to oxidize $S^=$ to elemental sulfur, the reaction solution itself comprising an effective amount of water-soluble organic polymeric chelate containing an oxidizing polyvalent metal;

(B) separating the treated fluid stream and chelate-containing aqueous phase produced in step (A);

(C) removing the elemental sulfur from the aqueous phase separated in step (B);
(D) treating the organic polymeric chelate-containing aqueous solution of step (C) by separation means effective to remove water and low molecular weight impurities;
(E) contacting the concentrated and purified aqueous solution of the chelate with an effective amount of an oxidizing agent to oxidize the polyvalent metal; and
(F) recycling the concentrated aqueous chelate solution of step (E) to the contacting zone of step (A).

In another embodiment, the organic polymeric chelate of reduced polyvalent metal is oxidized before separation from the elemental sulfur. That is, in the above process sequence, step (C) and step (E) are interchanged.

In another embodiment the invention relates to a process for the removal of $H_2S$ from a gas stream comprising $H_2S$, which process comprises:
(A) contacting the gas stream in a contacting zone with an aqueous solution at a temperature between about 10° and 90° C. for a time effective to oxidize $S=$ to elemental sulfur, said solution comprising an effective amount of a water-soluble organic polymeric chelate containing an oxidizing polyvalent metal and an oxidizing agent effective to continuously reoxidize the reduced polyvalent metal;
(B) separating the gas stream and the resulting aqueous phase produced in step (A);
(C) removing the elemental sulfur from the aqueous solution of step (B);
(D) treating the organic polymeric chelate-containing aqueous solution of step (C) by separation means effective to remove water and low molecular weight materials; and
(E) recycling the concentrated and purified aqueous solution of step (D) to the contacting zone of step (A).

BRIEF DESCRIPTION OF THE FIGURES

FIG. 1 illustrates a process in which an aqueous solution of an organic polymeric chelate (of a polyvalent metal) used in this invention is applied to the oxidation of hydrogen sulfide contained in a fluid stream, such as steam from geothermal wells, "sour" natural gases or sour refinery gas streams. Elemental sulfur is obtained by oxidation of the $H_2S$ and separated. The organic polymeric chelate of the reduced metal ion obtained is reoxidized to restore the metal to its original valence and the aqueous solution is concentrated and purified using dialysis or ultrafiltration techniques. The organic polymeric chelate of the metal—specifically ferric ion, is continuously recycled and re-used. The process improves on the known use of metal chelates to eliminate the environmental pollution problem associated with the discharge of an effluent stream containing toxic and noxious hydrogen sulfide.

FIG. 2 is similar to FIG. 1 in many aspects. The primary difference is that a reoxidizing agent for the metal-containing polymeric chelate is present when the sour gas is treated in the initial reaction zone. Thus, the reoxidizing agent continuously oxidizes Fe(II)-chelate to Fe(III)-chelate and the combination functions as an in situ regenerating catalyst, and the regeneration unit described in the FIG. 1 process is deleted.

FIG. 3 shows the effectiveness of the polymeric iron chelate in comparison to the monomeric iron chelate in the oxidation of hydrogen sulfide to sulfur.

FIG. 4 compares the oxidation of sulfide ion using a monomeric Fe (III) chelate and two polymeric Fe (III) chelates.

DETAILED DESCRIPTION AND PREFERRED EMBODIMENTS

With reference to the present application, the following definitions are to be used:

Fluid Stream

In the present invention "fluid stream" refers to any gaseous, liquid or combination gaseous-liquid stream. These fluid streams include, for example, geothermal steam, "sour" gas streams from a petroleum refinery, natural gas containing $H_2S$, and aqueous $H_2S$ solutions, and the like.

The Water-Soluble Polymeric Chelates

Any otherwise inert water-soluble polymeric chelate capable of chelating an oxidizing polyvalent metal is suitable in the present process. "Inert", in this context, is defined as not detrimentally reactive in the reaction to an intolerable extent. Polymeric chelates having a molecular weight between about 500 and 1,000,000 are preferred in the present process. Polymeric chelates having a molecular weight between about 1000 and 500,000 are more preferred.

Chelates are discussed in general by A. L. McCrary et al. in "Chelating Agents", *Kirk-Othmer: Encyclopedia of Chemical Technology,* Volume 5, pp. 339–368 (1979), which is incorporated herein by reference.

Polymeric chelates having the following structures are preferred:

(i)

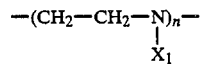

wherein $X_1$ in each polymer unit is independently selected from —H or from a substituent R— selected from —$CH_2COOH$, —$CH_2CH_2COOH$, —$CH_2$—$P(=O)(OH)_2$, or

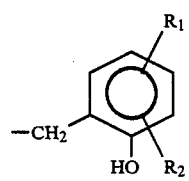

wherein $R_1$ and $R_2$ are each independently —$CH_3$, —$SO_3H$, —Cl, —H, or —COOH and n is an integer between about 5 and 20,000;

(ii)

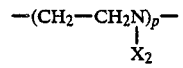

wherein $X_2$ in each polymer unit is selected from —H or a substituent selected from —$CH_2CH(OH)CH_2OH$, —$CH_2CH(OH)CH_2Cl$ or

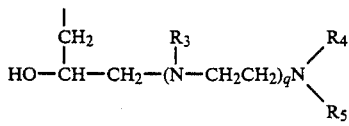

wherein $R_3$, $R_4$ and $R_5$ are each independently selected from R as defined hereinabove, p is an integer between about 5 and 20,000; and q is an integer selected from 0, 1, 2, 3 or 4;

(iii)

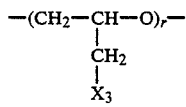

wherein $X_3$ in each polymer unit is independently selected from —OH, —Cl or a substituent:

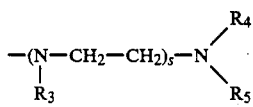

wherein $R_3$, $R_4$ and $R_5$ are as defined hereinabove; r is an integer between about 10 and 20,000, and s is an integer between about 1 and 4;

(iv)

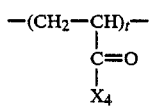

wherein $X_4$ in each polymer unit is independently selected from —OH, —OCH$_3$, —OCH$_2$CH$_3$ or a substituent:

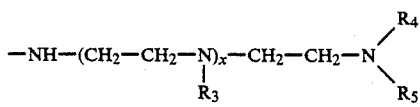

wherein $R_3$, $R_4$ and $R_5$ are as defined hereinabove, t is an integer between about 10 and 20,000; and x is an integer between 1 and 4;

(v)

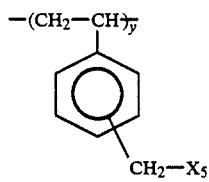

wherein $X_5$ in each polymer unit is independently selected from —OH, —Cl or a substituent:

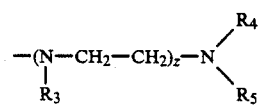

wherein $R_3$, $R_4$ and $R_5$ are as defined hereinabove; y is an integer between about 10 and 20,000, and z is an integer between about 1 and 4;

(vi)

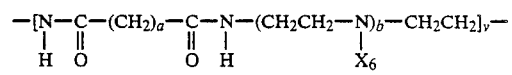

wherein $X_6$ in each polymer unit is independently selected from —H or a substituent —CH$_2$CH(OH)CH$_2$OH, —CH$_2$CH(OH)CH$_2$Cl, or

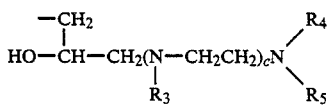

wherein v is between about 10 to 10,000, a is 6, b is 1 to 4, c is 1 to 4; and $R_3$, $R_4$ and $R_5$ are as defined hereinabove;

(vii)

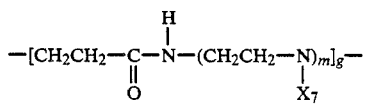

wherein $X_7$ in each polymer unit is independently selected from —H or a substituent selected from —CH$_2$CH(OH)CH$_2$OH, —CH$_2$CH(OH)CH$_2$Cl, or

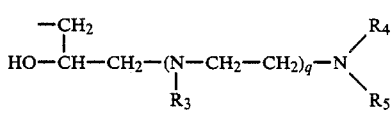

wherein m is an integer from 1 to 4, g is between 10 and 10,000, q and $R_3$, $R_4$ and $R_5$ are as defined hereinabove; or (viii)

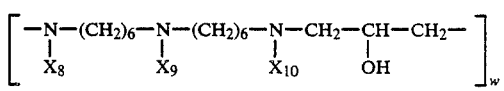

wherein $X_8$, $X_9$ and $X_{10}$ in each polymer unit are each independently selected from —H or a substituent selected from —CH$_2$CH(OH)CH$_2$Cl, —CH$_2$CH(OH)CH$_2$OH, or

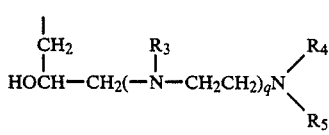

q, $R_3$, $R_4$ and $R_5$ are as defined hereinabove, w is between about 10 and 10,000; or (ix) mixtures of polymeric chelates (i) to (viii); with the proviso that the overall ratio of —H, —OCH$_3$, —OCH$_2$CH$_3$, —Cl, or —OH to substituent in each of $X_1$, $X_2$, $X_3$, $X_4$, $X_5$, $X_6$, $X_7$, $X_8$, $X_9$ or $X_{10}$ in each polymeric chelant (i to viii) hereinabove is between about 10/90 and 90/10.

In the above polymeric chelants (i to viii) in $R_3$, $R_4$ and $R_5$, the preferred groups are each —$CH_2COOH$ and —$CH_2CH_2COOH$, especially —$CH_2COOH$.

It is also contemplated that mixtures of the water-soluble organic polymeric chelates are useful in the present invention.

The concentration of the polymer should be at a level so as to provide up to about 1 gram equivalent weight of the chelating group per liter of solution. A preferred range is between about 0.05 and 1 gram equivalent.

The polymeric chelates described herein are prepared as is described hereinbelow. Some polyamines and polyethers used in the synthesis are described in Table I.

TABLE I
POLYAMINES AND POLYETHERS USED AS STARTING MATERIALS FOR SYNTHESIS OF POLYMERIC CHELATORS

| Amine | Degree of Polymerizaton (D.P.) | Molecular Weight Range | Nature of Chain |
|---|---|---|---|
| E-100[a] | 6 | 250–300 | Branched |
| PEI-6[b] | 15 | 600 | Branched |
| Hydrolyzed PEOx | 50[c] | 2000 | Linear |
| Purifloc C-31[d] | 500[e] | 10,000–30,000 | Branched |
| Hydrolyzed PEOx | 500[f] | 20,000 | Linear |
| PEI-600 | 1500 | 60,000 | Branched |
| Hydrolyzed PEOx | 5000[g] | 500,000 | Linear |

[a]E-100 is a byproduct of ethylenediamine manufacture and is a low molecular weight branched polymer containing about six ethyleneamine groups.
[b]PEI = polyethyleneimine; PEOx, polyethyloxazoline. PEI is a polymer of molecular weight 60,000 (CORCAT 600) and is obtained from Cordova Chemical Company. The nitrogen content is deteminted by drying a sample, and elemental analysis of the solid.
[c]100% hydrolyzed
[d]Purifloc C-31 is a polyethyleneamine produced by the Dow Chemical Company, Midland, Michigan.
[e]Probably also partially crosslinked.
[f]85% hydrolyzed
[g]97% hydrolyzed In the synthesis of the pendant polymeric chelants (i to viii), the procedure usually includes the addition of the pendant group to an available polymeric backbone. However, under the reaction conditions not all of the possible chelant additions occur on each repeating polymer ;unit of the polymer backbone. Thus, in chelate (i) where the repeating unit is:

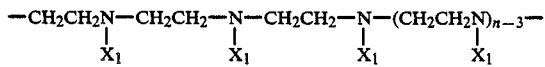

some of the pendent groups $X_1$ are —H and others are, for example, —$CH_2COOH$, e.g.:

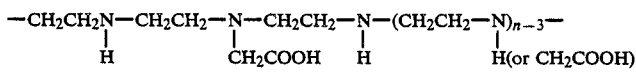

This type of random pattern of addition occurs for the pendent chelant groups in the polymeric chelants (i to viii). If the polymer backbone contains a pendant epoxide group, e.g.:

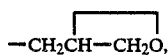

then after addition, if all epoxide groups do not react further, then the chemical groups —$CH_2CH(OH)C$-$H_2OH$ (hydrolysis), or $CH_2CH(OH)CH_2Cl$ are pendant groups on the polymer backbone.

One embodiment of the chelate designated (i)

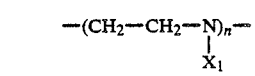

where $X_1$ is —H or —$CH_2COOH$ (CHELATE A) is prepared by dissolving polyethyleneimine (PEI 150 or PEI 600, available from the Dow Chemical Company) in water followed by reaction with excess sodium chloroacetate in the presence of strong base.

Another embodiment of the polymeric chelate designated (i) —$[CH_2$—$CH_2$—$N(X_1)]_n$—, where $X_1$ is —H or —$CH_2P(=O)(OH)_2$ (CHELATE B) is prepared by dissolving polyethyleneimine in water and reaction with phosphoric acid and formaldehyde. The process described by R. S. Mitchell in U.S. Pat. No. 3,974,090 for the monomer may be adapted using the polymeric imine.

A further embodiment of the polymeric chelate (i) designated

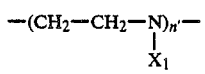

where $X_1$ is —H or

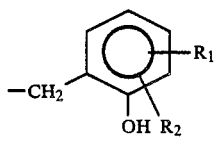

and $R_1$ and $R_2$ are each methyl (CHELATE C), is obtained by dissolving polyethyleneimine in water followed by treatment with 2,4-dimethylphenol and formaldehyde. The general procedure described by G. Grillot and W. Gormley, Jr., *J. Amer. Chem. Soc.*, Vol. 67, pp. 1968 ff (1945) for the monomer is adapted using the polymeric imine, and is incorporated herein by reference.

One embodiment of the polymeric chelate designated (ii) where $X_2$ is —H or —$CH_2CH(OH)CH_2N(CH_2COOH)CH_2CH_2N(CH_2COOH)_2$ and p is 2000 (CHELATE D), is obtained by first reacting epichlorohydrin,

with ethylenediamine-triacetic acid to produce Cl—$CH_2$—CH(OH)$CH_2$—N—(CH$_2$COOH)CH$_2$CH$_2$N(CH$_2$COOH)$_2$, followed by reaction with polyethyleneimine. The procedure described above for CHELATE A may also be adapted. For those polymers where q is 2, 3, or 4, the ethylenediamine is replaced with the corresponding diethylenetriamine, triethylenetetraamine and tetraethylene-pentamine, respectively.

Another embodiment is of the polymeric chelate designated (ii) wherein $X_2$ is —H or —CH$_2$CH(OH)CH$_2$[N(R$_3$)CH$_2$CH$_2$]$_q$N(R$_4$)(R$_5$), p is about 2,000, q is 0, and R$_4$ and R$_5$ are each —CH$_2$COOH. (CHELATE D-1), Iminodiacetic acid is dissolved in water and epichlorhydrin, about a 20% excess is added. The product is extracted with a chlorinated hydrocarbon such as methylene chloride to remove the unreacted epichlorhydrin. To this aqueous solution is added a 33% aqueous solution of polyethyleneimine e.g., CORCAT 600, heated and further treated with sodium hydroxide at a pH of 9–10. The chelate solution is used without further purification.

One embodiment of the polymeric chelate designated (iii) wherein $X_3$, is Cl, —OH or —[N(R$_3$)CH$_2$CH$_2$]$_s$N(R$_4$)(R$_5$), s is 1, r is about 100 and R$_3$, R$_4$ and R$_5$ are each —CH$_2$COOH (CHELATE E) is prepared by treating polyepichlorohydrin with ethylenediamine in the presence of base followed by treatment with excess sodium chloroacetate.

One embodiment of the chelate designated (iv) where $X_4$ is —OH or NH—[CH$_2$CH$_2$N(R$_3$)]$_x$CH$_2$CH$_2$N(R$_4$)(R$_5$), t is 100, x is 1 and R$_3$, R$_4$ and R$_5$ are each —CH$_2$COOH (CHELATE F) is prepared by the treatment of poly(ethylacrylate) with diethylenetriamine followed by treatment with sodium chloroacetate in the presence of a strong base.

One embodiment of the chelate designated (v) $X_5$ is —Cl, —OH or —[N(R$_3$)CH$_2$CH$_2$]$_z$N(R$_4$)(R$_5$) where R$_3$, R$_4$ and R$_5$ are each —CH$_2$COOH, y is 100 and z is 1 (CHELATE G) is the treatment of poly(vinylbenzylchloride) with ethylenediamine in the presence of strong base. The product in the presence of base, is next treated with excess sodium chloroacetate. By replacement of ethylenediamine with diethylenetriamine, triethylene tetraamine, and the like, the higher homologues are produced.

One embodiment of the chelate designated as (vi) where —$X_6$ is —CH$_2$CH(OH)CH$_2$OH or —CH$_2$CH(OH)CH$_2$[N(R$_3$)CH$_2$CH$_2$]$_c$N(R$_4$)(R$_5$) where R$_3$, R$_4$ and R$_5$ are each —CH$_2$COOH and c is 1 (CHELATE H) is obtained by the treatment of the commercial polymer KYMENE 557H which is obtained from the Hercules Corporation of Wilmington, Del., with ethylenediamine triacetic acid.

One embodiment of the chelate designated as (vii) where $X_7$ is —H or —CH$_2$CH(OH)CH$_2$]N(R$_3$)—CH$_2$CH$_2$]$_c$N(R$_4$)(R$_5$) where m is 1, g is about 1,000, q is 1 and R$_3$, R$_4$ and R$_5$ are each —CH$_2$COOH and n is 1 (CHELATE J), is obtained by reacting the polymer of methacrylic acid and ethylenediamine with ethylene diamine triacetic acid.

In one embodiment of the chelate designated (vii) $X_8$, $X_9$ and $X_{10}$ are each —H or —CH$_2$CH(OH)CH$_2$OH or —CH$_2$CH(OH)CH$_2$—N(R$_3$)CH$_2$CH$_2$N(R$_4$)(R$_5$), where R$_3$, R$_4$ and R$_5$ are each —CH$_2$COOH. The pendant adduct is obtained by reacting the commercially available FIBRABON 35 from the Diamond Shamrock Co., with ethylenediaminetriacetic acid in the presence of base (CHELATE K).

Generally in polymeric chelants (i) to (viii), the ratio of —H (or OCH$_3$, OCH$_2$CH$_3$, OH or Cl) to substituent in each of $X_1$ to $X_{10}$ is between about 10/90 to 90/10, more preferably the ratio is between about 10/90 and 40/60.

A more detailed description of the preparation for these organic polymeric chelates is provided below as part of the Examples.

The Polyvalent Metals

Generally, any polyvalent metal chelatable in both oxidized and reduced states can be used in the present invention as the metal component of polymeric chelate, but iron, copper and manganese are preferred. Iron is particularly preferred. The polyvalent metal chelate should be capable of oxidizing hydrogen sulfide while being reduced itself to the corresponding chelate of the metal in a lower valence state, and should then be oxidizable by oxygen or similar oxidation means to a chelate of the metal in a higher valence state, in typical redox reactions. Other polyvalent metals which can be used include tin, lead, platinum, tungsten, nickel, palladium, chromium, cobalt, vanadium, titanium, tantalum, zirconium and molybdenum.

Separation Means for Water and Low Molecular Weight Materials

The separation means to separate the organic polymeric chelate from the water and water-soluble low molecular weight products and materials can employ any single or combination of techniques suitable for this purpose. Preferably membrane separation, e.g., ultrafiltration and/or dialysis are used. More preferably, ultrafiltration is employed using a membrane consisting of any of a variety of synthetic polymers, in the shape of a film, hollow fiber or the like. Particularly useful for the removal of water and low molecular weight materials while retaining the water-soluble polymeric chelate are membranes such as: UM05, UM2, PM10 available from Amicon Company of Danvers, Mass.

Ultrafiltration is described by R. R. Klinkowski in *Kirk Othmer: Encyclopedia of Chemical Technology*, Vol. 23, pp. 439–461 (1983) and dialysis procedures and technology are described by E. F. Leonard in the same source, Vol. 7, pp. 564–579 (1979).

DETAILED DESCRIPTION OF THE FIGURES

In FIG. 1, the sour gas stream for example, spent geothermal steam or natural gas containing about 1.0 percent by volume of H$_2$S, or a refinery stream containing up to about 1.0 percent by volume of H$_2$S in line 1 enters column 2 which contains an admixture comprising an aqueous solution (about 1 molar), of a water-soluble polymeric chelate as described herein containing a polyvalent metal in oxidized form. Fe$^{+3}$ is preferred and will be used hereafter. It is to be understood that Fe$^{+3}$ (oxidized form) and Fe$^{+2}$ (reduced form) as used herein will be representative of any comparable polyvalent metal. The pressure of the feed gas is generally not critical and may vary from between about 10 and 1000 pounds per square inch gauge (psig). A preferred pressure range is between about 15 and 100 psig. The temperature of the aqueous admixture is between about 10° and 90° C., with between 20° and 80° C. being preferred. A more preferred temperature range is between about 20° and 50° C. A suitable contact time between the aqueous admixture and the sour gas is usually between about 1 sec and 5 min, with between about 2 sec and 1 min being preferred. This time period is normally sufficient to oxidize substantially all of the sulfide ions to elemental sulfur (S°). The purified or sweetened gas stream then leaves zone 2 via line 3. Generally, the purified gas exiting in line 3 meets standard environmental emission standards for H₂S.

In the aqueous admixture, the H₂S has been converted by the Fe(III)-containing polymeric chelate to elemental sulfur particles. The Fe(III) is simultaneously reduced to Fe(II) in the polymeric chelate. The aqueous mixture containing solid sulfur particles and water-soluble polymeric chelate of Fe(II) is removed in a continuous manner through line 4, optionally to a degassing and depressurization unit 5. Additional gases are evolved through line 6.

Sulfur separation and removal are accomplished by any conventional means, e.g., precipitation, centrifugation. The crude aqueous mixture is conveyed by line 7 to separation unit 8. Preferably, unit 8 is a filtration unit. It is not necessary that all sulfur be removed at this stage via line 9. Those skilled in the art will know to adjust conditions to achieve the appropriate rates of withdrawal of the liquid and gas streams.

The polymeric chelate containing aqueous solution now free of elemental sulfur is conveyed via line 10 to a second separator unit 11. This separator uses means to separate excess water and low molecular weight products and byproducts. Generally, the means used are ultrafiltration or dialysis, with ultrafiltration being preferred. The water and low molecular weight materials, such as EDTA, etc. having a molecular weight of less than 1000, preferably less than 500, are separated and conveyed away through line 12 and disposed of in an environmentally acceptable manner. The concentrated aqueous polymeric chelate is then conveyed through line 13 to regeneration zone 14.

In the regeneration zone or column 14, the mixture is contacted with an oxidizing agent, such as, excess air or oxygen, entering through line 15 to convert the Fe(II)-polymeric chelate to the Fe(III)-polymeric chelate. The temperature of the column may vary between 0° and 50° C., preferably between 20° and 40° C. and the pressure is between about 10 and 100 psig, more preferably 20 and 50 psig.

The polymeric chelate containing the oxidized metal [Fe(III)] is then conveyed through line 16 to contacting zone 2 to begin the reaction process cycle again. As needed, make-up water, polymeric chelate and polyvalent metal are added to the process through line 17.

Some variations in the sequence of the process shown in FIG. 1 are contemplated within this invention. These include interchanging the positions of separator 8 for the elemental sulfur and separator 11 for removal of the water and low molecular weight materials. Thus, a portion of the wat4er and low molecular weight materials may be separated with the elemental sulfur particles produced still present, although the elemental sulfur might tend to clog the pores of an ultrafiltration or dialysis membrane.

An additional variation of the present process described in FIG. 1 is the removal of separation unit 11, the combination of lines 10 and 13, and the insertion of unit 11 into line 16 between regeneration unit 14 and the point where makeup line 17 combines with recycle line 16. A difficulty encountered in this configuration is that large volumes of aqueous liquid are subject to processing through unit 14.

In FIG. 2, a number of the apparatus elements, i.e., 1 to 12 correspond to similarly numbered elements in FIG. 1 and have essentially the same function. In this embodiment an oxidizing agent, e.g., oxygen, is added to contactor unit 2 through line 1A at the same time that the aqueous organic polymeric chelate of Fe(III) is added through line 1. In this embodiment the Fe(III) is reduced to Fe(II) as the H₂S present is oxidized to elemental sulfur, and concurrently the Fe(II) produced is simultaneously oxidized to Fe(III) by the oxygen present. The following equations are illustrative:

$$H_2S_{(gas)} + 2[Fe(III)\cdot Polymeric\ chelate] \longrightarrow$$

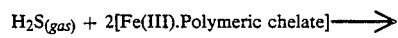

$$2H^+ + 2[Fe(II)\cdot Polymeric\ chelate] + S°$$

$$\tfrac{1}{2} O_2(gas) + H_2O + 2[Fe(II)\cdot Polymeric\ chelate] \longrightarrow$$

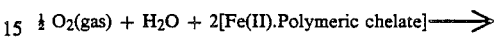

$$2OH^- + 2[Fe(III)\cdot Polymeric\ chelate]$$

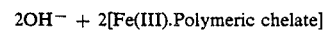

Combining these equations, the overall reaction is represented by the following equation:

$$H_2S_{(gas)} + \tfrac{1}{2}O_2(gas) \rightarrow S° + H_2O$$

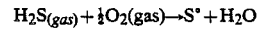

Iron levels in a number of polymeric chelates were in the range of 0.03M as shown in Table II. The ratio of chelate to iron is not greatly dependent upon the total iron level because of the stability of the chelate. As can be seen from Table II, value W is important because it is the mole ratio of nitrogen in the chelator (polymeric chelator) to iron at the point of incipient precipitation at room temperature. This value represents essentially the maximum amount of iron in the chelate.

TABLE II

| CHELATION OF IRON (III) BY POLYCHELATORS | | |
|---|---|---|
| Ratio W is the mole ratio of nitrogen in chelating monomer or polymer to iron at point of incipient precipitation at room temperature. pH in all test is 7 ± 0.5. | | |
| Chelator | (Fe), M | W |
| EDTA | 0.03 | 2.0 |
| MBEDTA | 0.03 | 2.2 |
| Sym. EDDA | 0.03 | >10 |
| DTDA | 0.015 | >9 |
| DTPA | 0.03 | 2.5 |
| TTHA | 0.05 | 2.3 |
| CM E-100 | 0.04 | 3.4 |
| CM PEI 6 | 0.045 | 3.2 |
| CM PEOx, DP-50 | 0.025 | 5 |
| CM PEOx, DP-1000 | 0.025 | 4 |
| CM PEOx, DP-10,000 | 0.015 | 4.2 |
| CM C-31 (Purifloc C-31) (Dow) | 0.04 | 5 |

EDTA — Ethylenediamine tetracetic acid
MBEDTA — Methyl-p-benzylethylenediaminetriacetic acid
Sym. EDDA — Sym. Ethylenediaminediacetic acid
DTDA — Diethylenetriaminediacetic acid
DTPA — Diethylenetetraaminepentaacetic acid
TTHA — Triethylenetetraaminehexaacetic acid
CM — Carboxymethyl
PEI — Polyethyleneimine
PEOx — Polyethyleneoxazoline The following Examples are to be construed as being illustrative and are not limiting in any way. For $X_1$ to $X_{10}$ in the Examples, the pendant group in each polymer unit of the polymer is selected from those designated. It is also to be understood that from the description herein that when complete or partial addition of the pendant chelating group on the polymer backbone is desired the experimental synthesis conditions need only to be adjusted. That is, if only partial substitution is required, adjustment to shorter reaction times, lower concentrations of reactants, lower reaction temperatures and those techniques known in the art are used. For more complete or complete additions of the pendant chelating groups to the polymer backbone is desired, longer reaction times, higher concentration of reactants and higher reaction temperatures are used. The molecular weight of the polymers described herein are usually expressed as the weight average molecular weight.

EXAMPLE 1

Organic Polymeric Chelate (i) Based on Polyethyleneimine (PEI)

[CHELATE A; $X_1$ is —H or —$CH_2COOH$]

(a) Polyethyleneimine 11 g [degree of polymerization (DP) 1500] is dissolved in water (200 ml) to produce a solution of 1.25 molar (in amine nitrogen). To the aqueous solution is added sodium chloroacetate (31 g, a 5% excess) with stirring while maintaining the reaction mixture at about 60° C. A pH electrode is used to monitor the reaction and 50% sodium hydroxide is added to maintain the pH above about 10. After 40 minutes of reaction the reaction is complete, and the reaction mixture is allowed to cool. The aqueous solution is diluted to 1.0M (amine nitrogen) and used without further purification.

EXAMPLE 1A

Preparation of Polymeric Chelate (i)

[CHELATE B: $X_1$ is —H or —$CH_2 P(=O)(OH)_2$]

To a 500 ml flask equipped with a water condenser and dropping funnel are added 99 g (0.6 mole) of 49.9% orthophosphorous acid (which also contains 9.4 g of hydrogen chloride) and 5.2 g of 37% hydrochloric acid. The total mole of hydrogen chloride used is 0.4. The resultant mixture is then allowed to heat by the addition of 14 g of CORCAT 150 (Cordova Chemical Co.) as a 33% aqueous solution of polyethyleneimine containing 0.1 mole of amine nitrogen. The polyamine is added over a period of 8 to 10 minutes while the reaction mixture achieves a temperature of about 70°–75° C. The reaction mixture is then heated for about 20 minutes to the boiling temperature thereby producing a homogenous clear solution having a boiling point of between 110°–115° C. The resulting clear aqueous solution is maintained at boiling for about 2 hrs., and 22 g (0.66 mole) of paraformaldehyde is added. After the 2-hr. period, the clear reaction mixture is kept boiling for an additional 30 min and cooled to about 25°–30° C. The clear solution has an amber color, and contains about 50% by weight of the polyethyleneimine phosphonate which is used without further purification.

EXAMPLE 1B

Preparation of Polymeric Chelate (i)

[CHELATE C: $X_1$ is —H or 6-methylene-2,4-dimethylphenol]

To a 13 g aqueous solution (33%) of polyethyleneimine CORCAT 150 (from Cordova Chemical Company) containing 0.1 mole of available amine nitrogen is added 10.8 g of 2,4-dimethylphenol(0.1 mole). The solution was maintained below 20° C., while a 37% aqueous formaldehyde solution (0.11 mole) was added slowly with stirring. The solution was allowed to stand for an hour at ambient temperature and then warmed to 80° C. for 2 hrs. The aqueous solution was used without purification in subsequent experiments.

EXAMPLE 2

Preparation of Polymeric Chelate (ii)

[CHELATE D: $X_2$ = —H or —$CH_2CH(OH)CH_2N(CH_2COOH)$—$CH_2CH_2N(CH_2COOH)_2$]

This preparation was performed in two steps: (1) attachment of ethylenediamine to the polymer; and (2) conversion of the amine of the ED3A.

Step 1: 23.5 Grams of polyepichlorhydrin (0.25 Mole monomer unit) and 94 grams of 85% ethylenediamine (1.3 moles) were dissolved in 50 ml isopropanol and 25 ml of toluene and refluxed (about 100° C.) for six hrs. As the reaction proceeded additional isopropanol was added to maintain homogeneity, with the final system being about 75/25 isopropanol/toluene. The reaction was followed by titrating aliquots for chloride ion with silver nitrate. Next, 20 grams of 50% NaOH (0.25 mole) was added, the solid NaCl which formed was filtered, washed with ethanol, and the liquid was removed in a vacuum evaporator at 55° C. Although some NaCl remained in the product, the elemental analysis gave a C:H:N mole ratio of 4.6:12.1:2.00 (Expected mole ratio was 5:12:2).

Step 2: This intermediate was taken up in about 200 ml of water, to which 3.3 moles of sodium chloroacetate was added per mole of nitrogen. The system was kept at about 60° C. and a pH of about 10 for about one hr. At this point a white precipitate (presumably NaCl) was filtered off, the pH was adjusted to about 2 (the expected isoelectric point), at which point considerable white solid formed. This solid was filtered and found to be EDTA, presumably formed because all of the unreacted ethylenediamine had not been removed during the vacuum evaporation. The filtrate was dialyzed against about 4 liters of water.

An estimate of the EDTA content of the dialyzed (polymeric) material was made by titrating an aliquot with iron (III). About one-third of the expected chelant groups were found in the polymer fraction.

EXAMPLE 2A

Preparation of Polymeric Chelate (ii)

[CHELATE D-1: p=2,000, $X_2$ is —H or —$CH_2CH(OH)CH_2N(CH_2COOH)_2$]

14.3 Grams (0.1 mole) of iminodiacetic acid was dissolved in 100 ml of water. To this solution was added 0.12 mole epichlorhydrin, about a 20% excess. After allowing the solution to stand for an hour at ambient temperature it was extracted with 50 ml of methylene chloride to remove the unreacted epichlorhydrin. To the aqueous phase from this extraction was added 14.7 grams of a 33% solution of polyethyleneimine CORCAT 600 (Cordova Chem. Co., Muskegon, Mich.), an amount determined to contain 0.1 mole of nitrogen. The solution was heated to 60° C., while sodium hydroxide solution (10N) was added at a rate sufficient to maintain the pH in the range of 9–10. After about 30 minutes the reaction was complete and the resulting solution, which now contained the polyethyleneimine with iminodiacetic acid groups attached to it, was used without purification in subsequent experiments.

EXAMPLE 3

Preparation of Polymeric Chelate (iii)

[CHELATE E: $X_3$ is —OH, —Cl or —$N(CH_2COOH)CH_2CH_2]N(CH_2COOH)_2$

224 Grams (0.1 mole) of ethylenediamine triacetic acid is dissolved in 100 ml of water. To this solution is added 0.12 mole of polyepichlorohydrin, about a 20% excess [HYDRIN 10×1 (DP~40)], from B. F. Goodrich Co., Cleveland, Ohio, is dissolved in toluene/-methylene chloride (50/50; v/v). Tetrabutylammonium chloride (0.01 mole) is added as a phase transfer catalyst. The solution is stirred for about an hour at ambient temperature. The HCl produced is taken up by the addition of sodium hydroxide. The aqueous polymeric chelate is subsequently used without purification.

EXAMPLE 4

Preparation of Polymeric Chelate (iv)

[CHELATE F: $X_4$ is —OH or —$NH[CH_2CH_2N(CH_2N(CH_2COOH)]CH_2CH_2N(CH_2COOH)_2$

Poly(methylacrylate) (86 g., equivalent to one mole of formula weight of the monomeric methyl acrylate) is dissolved in about 300 ml of toluene, and 520 g of diethylenetriamine (5 moles) are added. The solution is heated to 40°-50° C. for an hour and the excess amine and toluene are evaporated under vacuum. The residue is taken up in 500 ml of water and 348 g. of sodium chloroacetate (3.0 mol) are added to the solution, and heated to about 60° C. for about 30 minutes while sodium hydroxide is added at a rate sufficient to maintain the pH at 9–10. This solution, which had the desired structure is used without further purification in subsequent experiments.

EXAMPLE 5

Preparation of Polymeric Chelate (v)

[CHELATE G: $X_5$ is —OH or —$N(CH_2COOH)CH_2CH_2N(CH_2COOH)_2$ and y is 100

Polyvinylbenzyl chloride (15 g., equivalent to 0.1 mole of monomer units) is dissolved in 100 ml of methylene chloride, and 30 g of ethylenediamine (0.5 mole) were added. The solution is warmed to 40° C. and stirred for 2 hours. The excess amine and methylene chloride are evaporated under vacuum. The resulting polymer is taken up in 200 ml of water and carboxymethylated as in the preceding example. The resulting polymer has the desired structure and is used further without purification.

EXAMPLE 6

Preparation of Polymeric Chelate (vi)

[CHELATE H: $X_6$ is —H or —$CH_2CH(OH)CH_2N(CH_2COOH)CH_2CH_2N(CH_2COOH)_2$

Eighty grams of the polymer KYMENE 557H (0.1 mole monomer equivalent) (Hercules Corporation, Wilmington, Del.), which is a copolymer of adipic acid, diethylenetriamine and epichlorhydrin was added to a solution of 46 g of ethylenediaminetriacetic acid in about 200 ml of water (a twofold excess). The solution was heated to 80° C. for two hours. The resulting solution which contained the desired polymer (vi) was used without further purification in subsequent experiments.

EXAMPLE 7

Preparation of Polymeric Chelate (vii)

[CHELATE J; $X_7$ is —H or —$CH_2CH(OH)CH_2N(CH_2COOH)$—$CH_2CH_2N(CH_2COOH)_2$, m is 1, and g is about 100.

A solution of an adduct of epichlorhydrin and iminodiacetic acid, as prepared in Example 2A, was added to an equimolar quantity of a polymer solution made by reacting equimolar quantities of methyl acrylate and ethylenediamine. The solution was heated to 80° C. for 2 hours, and the resulting polymer was used in subsequent experiments.

EXAMPLE 8

Preparation of Polymeric Chelate (viii)

[CHELATE K; $X_8$, $X_9$ and $X_{10}$ are —H, —$CH_2CH(OH)CH_2OH$ or —$CH_2CH(OH)CH_2N(CH_2COOH)CH_2CH_2N(CH_2COOH)_2$ Fifty four grams of the commercial polymer Fibrabon 35 (Diamond Shamrock Corporation, Cleveland, Ohio) which contained 100 millimoles of active epichlorhydrin groups, was mixed with a solution of 46 grams of ethylenediaminetriacetic acid (0.2 mole), the solution was heated to 60° C. and sodium hydroxide was added at a rate sufficient to maintain the pH at about 9-10. After about 2 hours, the reaction was over and the solution was used in subsequent experiments. About 1 of $X_8$, $X_9$ and $X_{10}$ in each polymer unit is a pendant chelating group.

EXAMPLE 9

Dialysis of Iron Polychelates

In the dialysis, 100 ml of iron organic chelate, made up to be about 0.1 molar in iron, was dialyzed into two liters of deionized water overnight. The CM PEI 150 and CM PEI 600 polychelators were dialyzed through SPECTROPOR 1, from Van Waters & Rogers, San Francisco, Calif. which has a nominal molecular weight cut-off of about 6000-8000. In both cases, about 3-5% of the iron was lost. The CM PEI 6 solution was dialyzed through SPECTROPOR 6 (Van Waters & Rogers) which has a cut-off of about 2000. In this case about 10% of the iron was lost.

EXAMPLE 10

Ultrafiltration of Iron Polychelates

The ultrafiltration tests were performed in an Amicon Model 52 cell which is a cylindrical chamber with a 43 mm diameter (12.5 cm) membrane as the bottom surface. The cell volume is about 60 ml and the cell contains a suspended magnetic stirring bar to reduce polarization effects. In a run, a 25-ml volume of solution was placed in the cell and the gas space was connected to an air line maintained at 15 psig.

Three membranes were used for this study, all obtained from the Amicon Corporation of Danvers, Mass. They were designated as UM 05, UM 2 and PM 10 having nominal molecular weight cutoffs of 500, 1000 and 10,000, respectively. The iron was determined by the standard thiocyanate method.

The results are shown below in Table III.

TABLE III

ULTRAFILTRATION AND DIALYSIS OF IRON POLYCHELATES

| | Membrane | | | | |
| --- | --- | --- | --- | --- | --- |
| | UM 05 | UM 2 | | PM 10 | |
| Polychelator | Rejection % | Rejection % | Flow gsfd* | Rejection % | Flow gsfd* |
| CM PEI 600 | 89 | 98 | 1.3 | 91 | 6 |
| CM PEI 600 (dialyzed) | | 99 | 2.8 | 95 | 16 |
| CM PEI 150 (dialyzed) | | 95 | 1.4 | 97 | 9 |
| CM PEI 6 | | 80–90 | 0.8 | 25 | 28 |
| CM PEI 6 (dialyzed) | 61 | 90 | >0.3 | | |
| CM E-100 | 84 | 92 | 0.6 | 27 | 40 |
| EDTA | 23 | 10 | 1 | | |
| Deionized H₂O only | | | 5 | | 100 |

[CM PEI — Carboxymethyl polyethyleneimine, etc.]
Rejection % values are averages over steady state portion of run.
Flow values are interpolated or extrapolated to 0.10 M Fe.
Rejection %-the amount of chelate (or material) which did not pass through the membrane.
*gsfd = gal/ft$^2$ × day As can be seen from Table III, polychelates based on carboxymethylated polyethyleneimine 6 (CM PEI 6, about 15 monomer units) or larger polymers are fairly well rejected by ultrafiltration membranes having cut-offs in the molecular weight range of 1000–10,000. CM PEI 6 is strongly rejected (80–90%) by Amicon UM 2 membrane (having a cut-off value of 1000), but poorly (20–30%) by PM 10 (cut-off 10,000). Higher polymers CM PEI 150 and CM PEI 600 are both strongly rejected 95–99% by both membranes.

At a concentration of 0.1M chelated iron (III) output from an Amicon UM 2 membrane is about 1 gallon per square foot per day (gsfd) with the polychelators of Table III at a pressure of 15 psig. For the PM 10 membrane, the output is 6–30 gsfd. Output was strongly dependent upon iron concentration.

EXAMPLE 11

Removal of Sulfide Ion

One hundred ml of a solution of sodium sulfide (30 ppm of S$^=$, 0.00094 Molar) was buffered at a pH of 7.8 using 0.01M triethanolamine. Air was bubbled through the solutions at 200 ml/min and samples were removed periodically to determine sulfide ion level. The disappearance of S$^=$ is shown in FIG. 3. An identical experiment was run in which an iron (III) chelate was present at a concentration of 0.000188 Molar, i.e., one-tenth of the stoichiometric concentration for the direct oxidation of the sulfide by iron to sulfur. The disappearance of sulfide is shown also in FIG. 3 and is considerably more rapid in the presence of the chelate. The polymeric chelate was carboxymethylpolyethyleneimine PEI 150 —[CH$_2$CH$_2$—N(CH$_2$COOH)]$_{dp}$ where the degree of polymerization (dp) is about 300.

As can be seen from FIG. 3, the S$^=$ level decreases only slightly slower for the polymeric iron (III) chelate as with the monomeric iron (III) chelate.

FIG. 4 compares the oxidation of sulfide by Fe (III) chelates generally using the conditions described above. As can be seen both of the polymeric chelates CM PEI 6 and CM PEI 150 are as effective as the monomeric chelates within 2 to 3 minutes.

EXAMPLE 12

Removal of H$_2$S with Recycle

A gas stream from a geothermal steam well having a H$_2$S concentration of 0.99 weight % enters a contact vessel into which also enters an aqueous mixture containing 1.0 percent by weight of Fe (based on the total weight of the mixture) as Fe (III) polymeric chelate of carboxymethyl polyethyleneimine (CM PEI 6). The chelate is supplied in a 10 percent molar excess based on iron and the pH of the system is 6. The pressure of the feed gas is about 15 psig and the temperature of the mixture is about 35° C. A contact time of about 60 seconds is used. The H$_2$S is converted to elemental sulfur by the Fe (III) polymeric chelate which is reduced to Fe (III) polymeric chelate. The sulfur produced is fine particles and is separated by filtration. The aqueous solution is treated by ultrafiltration using an Amicon UM 2 membrane and apparatus. The CM PEI 6 is retained in the aqueous system while the lower molecular weight material (below 1000) are removed. The aqueous solution containing the CM PEI 6 Fe (II) is treated with oxygen to reoxize the iron (II) to iron (III) and recycled to the contact vessel.

EXAMPLE 13

Removal of H$_2$S with Simultaneous Oxidation of Iron (II) Chelate

The H$_2$S gas stream of Example 12 is treated as is shown in FIG. 2 with a simultaneous oxygen flow to the contact chamber of 2 ml/min. The H$_2$S is oxidized and removed as elemental sulfur and the aqueous solution containing the CM PEI 6 Fe (III) is recycled and reused.

While only a few embodiments of the invention have been shown and described herein, it will become apparent to those skilled in the art that various modifications and changes can be made in the process to remove H$_2$S and S$^=$ from fluid streams using a polymeric metal chelate without departing from the spirit and scope of the present invention. All such modifications and changes coming within the scope of the appended claims are intended to be covered thereby.

We claim:

1. A cyclic process for the removal of H$_2$S from a gas stream comprising H$_2$S, which process comprises:
   (A) contacting the gas stream in a contacting zone with an aqueous reaction solution at between about 10° and 90° C. for a time sufficient to oxidize S$^=$ to elemental sulfur the reaction solution itself consisting of an amount of water-soluble organic polymeric chelate effective to oxidize the S$^=$ to elemental sulfur containing an oxidizing polyvalent metal selected from an organic polymeric chelate having a molecular weight of between about 1,000 and 500,000 daltons of the formula:
   (i)

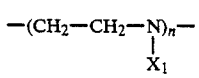

wherein X$_1$ in each polymer unit is independently selected from —H or from a substituent R— selected from —CH$_2$COOH, —CH$_2$CH$_2$COOH, —CH$_2$—P(=O) (OH)$_2$, or

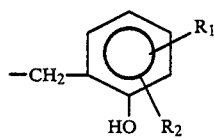

wherein $R_1$ and $R_2$ are each independently —$CH_3$, —$SO_3H$, —Cl, —H, or —COOH and n is an integer between about 5 and 20,000;

(ii)

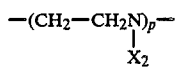

wherein $X_2$ in each polymer unit is selected from —H or a substituent selected from —$CH_2CH(OH)CH_2OH$, —$CH_2CH(OH)CH_2Cl$ or

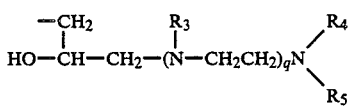

wherein $R_3$, $R_4$ and $R_5$ are each independently selected from R as defined hereinabove, p is an integer between about 5 and 20,000; and q is an integer selected from 0, 1, 2, 3 or 4;

(iii)

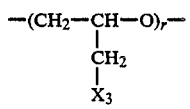

wherein $X_3$ in each polymer unit is independently selected from —OH, —Cl or a substituent:

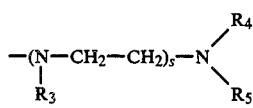

wherein $R_3$, $R_4$ and $R_5$ are as defined hereinabove; r is an integer between about 10 and 20,000, and s is an integer between about 1 and 4;

(iv)

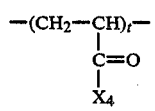

wherein $X_4$ in each polymer unit is independently selected from —OH, —$OCH_3$, —$OCH_2CH_3$ or a substituent:

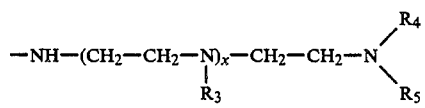

wherein $R_3$, $R_4$ and $R_5$ are as defined hereinabove, t is an integer between about 10 and 20,000; and x is an integer between 1 and 4;

(v)

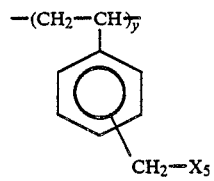

wherein $X_5$ in each polymer unit is independently selected from —OH, —Cl or a substituent:

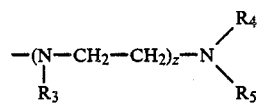

wherein $R_3$, $R_4$ and $R_5$ are as defined hereinabove; y is an integer between about 10 and 20,000, and z is an integer between about 1 and 4;

(vi)

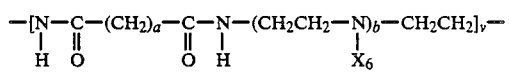

wherein $X_6$ in each polymer unit is independently selected from —$CH_2CH(OH)CH_2OH$, —$CH_2CH(OH)CH_2Cl$, or

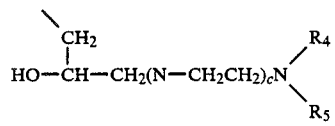

wherein v is between about 10 to 10,000, a is 6, b is 1 to 4, c is 1 to 4; and $R_3$, $R_4$ and $R_5$ are as defined hereinabove;

(vii)

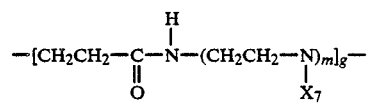

wherein $X_7$ in each polymer unit is independently selected from —H or a substituent selected from —$CH_2CH(OH)CH_2OH$, —$CH_2CH(OH)CH_2Cl$, or

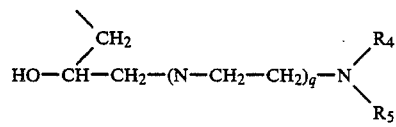

wherein m is an integer from 1 to 4, g is between 10 and 10,000, q and $R_3$, $R_4$ and $R_5$ are as defined hereinabove; or (viii)

$$\left[ -N-(CH_2)_6-N-(CH_2)_6-N-CH_2-CH-CH_2- \right]_w$$
$$\phantom{xxxx}\mid\phantom{xxxxxxxx}\mid\phantom{xxxxxxxx}\mid\phantom{xxxxxx}\mid$$
$$\phantom{xxxx}X_8\phantom{xxxxxxxx}X_9\phantom{xxxxxxx}X_{10}\phantom{xxxx}OH$$

wherein $X_8$, $X_9$ and $X_{10}$ in each polymer unit are each independently selected from —H or a substituent selected from —CH$_2$CH(OH)CH$_2$Cl, —CH$_2$CH(OH)CH$_2$OH, or $$-CH_2\phantom{xxxx}R_3\phantom{xxxxx}R_4$$
$$\phantom{xx}\mid\phantom{xxxxxxx}\mid\phantom{xxxxx}/$$
$$HOCH-CH_2(-N-CH_2CH_2)_qN$$
$$\phantom{xxxxxxxxxxxxxxxxxxxxxx}\backslash$$
$$\phantom{xxxxxxxxxxxxxxxxxxxxxxxx}R_5$$

q, $R_3$, $R_4$ and $R_5$ are defined hereinabove, w is between about 10 and 10,000; or (ix) mixtures of polymeric chelates (i) to (viii); with the proviso that the overall ratio of —H, —OCH$_3$, —OCH$_2$CH$_3$, —Cl, or —OH to substituent in each of $X_1$, $X_2$, $X_3$, $X_4$, $X_5$, $X_6$, $X_7$, $X_8$, $X_9$ or $X_{10}$ in each polymeric chelant (i to viii) hereinabove is between about 10/90 and 90/10;

(B) separating the gas stream and the resulting aqueous phase containing sulfur and polymeric chelated-metal complex produced in step (A);

(C) separating the sulfur from the aqueous phase separated in step (B);

(D) treating the aqueous solution produced in step (C) by membrane separation means effective to remove water and other monomeric reaction products present having a molecular weight of less than 500 daltons from the aqueous solution;

(E) contacting the concentrated aqueous solution produced in step (D) with an oxidizing agent under reaction conditions effective to oxidize the polyvalent metal in chelate form; and (F) recycling the concentrated aqueous solution from step (E) to the contacting zone of step (A).

2. The process of claim 1 wherein in step (D) the aqueous solution is concentrated by membrane means selected from ultrafiltration and dialysis.

3. The process of claim 2 wherein the means is ultrafiltration.

4. The process of claim 2 wherein the step (A) the polymeric chelant is chelant (viii).

5. The process of claim 2 wherein in step (A) the metal is iron.

6. The process of claim 2 wherein the water-soluble polymeric chelate containing an oxidizing polyvalent metal is:

$$-(CH_2-CH_2-N)_n-$$
$$\phantom{xxxxxxxxx}\mid$$
$$\phantom{xxxxxxxxx}CH_2$$
$$\phantom{xxxxxxxxx}\mid$$
$$\phantom{xxxxxxxxx}COOH$$

wherein n is an integer between 10 and 10,000.

7. A cyclic process for removal of H$_2$S from a gas stream comprising H$_2$S, which process comprises:

(A) contacting the gas stream in a contacting zone with an aqueous solution at a temperature between about 10° and 90° C. for a time effective to oxidize the sulfur contained in the H$_2$S to elemental sulfur, the reaction itself consisting of an amount of water-soluble organic polymeric chelate having a molecular weight of between about 1,000 and 500,000 daltons selected from those of the formula:

(i)

$$-(CH_2-CH_2-N)_n-$$
$$\phantom{xxxxxxxxx}\mid$$
$$\phantom{xxxxxxxxx}X_1$$

wherein $X_1$ in each polymer unit is independently selected from —H or from a substituent R— selected from —CH$_2$COOH, —CH$_2$CH$_2$COOH, —CH$_2$—P(=O)(OH)$_2$, or $$\phantom{xxxxxxx}R_1$$
$$-CH_2-\langle\text{phenyl}\rangle$$
$$\phantom{xxxxxx}HO\phantom{xx}R_2$$

wherein $R_1$ and $R_2$ are each independently —CH$_3$, —SO$_3$H, —Cl, —H, or —COOH and n is an integer between about 5 and 20,000;

(ii)

$$-(CH_2-CH_2N)_p-$$
$$\phantom{xxxxxxxx}\mid$$
$$\phantom{xxxxxxxx}X_2$$

wherein $X_2$ in each polymer unit is selected from —H or a substituent selected from —CH$_2$CH(OH)CH$_2$OH, —CH$_2$CH(OH)CH$_2$Cl or $$-CH_2\phantom{xxxx}R_3\phantom{xxxxx}R_4$$
$$\phantom{xx}\mid\phantom{xxxxxxx}\mid\phantom{xxxxx}/$$
$$HO-CH-CH_2-(N-CH_2CH_2)_qN$$
$$\phantom{xxxxxxxxxxxxxxxxxxxxxx}\backslash$$
$$\phantom{xxxxxxxxxxxxxxxxxxxxxxxx}R_5$$

wherein $R_3$, $R_4$ and $R_5$ are each independently selected from R as defined hereinabove, p is an integer between about 5 and 20,000; and q is an integer selected from 0, 1, 2, 3 or 4;

(iii)

$$-(CH_2-CH-O)_r-$$
$$\phantom{xxxxxxxx}\mid$$
$$\phantom{xxxxxxxx}CH_2$$
$$\phantom{xxxxxxxx}\mid$$
$$\phantom{xxxxxxxx}X_3$$

wherein $X_3$ in each polymer unit is independently selected from —OH, —Cl or a substituent:

$$\phantom{xxxxxxxxxxxxx}R_4$$
$$\phantom{xxxxxxxxxxx}/$$
$$-(N-CH_2-CH_2)_s-N$$
$$\phantom{xx}\mid\phantom{xxxxxxxxxxxx}\backslash$$
$$\phantom{xx}R_3\phantom{xxxxxxxxxxx}R_5$$

wherein $R_3$, $R_4$ and $R_5$ are as defined hereinabove; r is an integer between about 10 and 20,000, and s is an integer between about 1 and 4;

(iv)

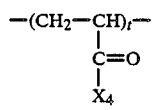

wherein $X_4$ in each polymer unit is independently selected from —OH, —OCH$_3$, —OCH$_2$CH$_3$ or a substituent:

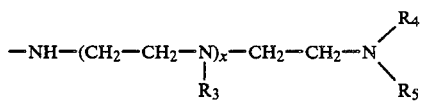

wherein $R_3$, $R_4$ and $R_5$ are as defined hereinabove, t is an integer between about 10 and 20,000; and x is an integer between 1 and 4;

(v)

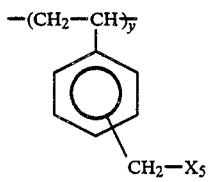

wherein $X_5$ in each polymer unit is independently selected from —OH, —Cl or a substituent:

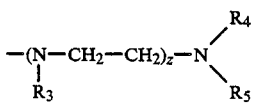

wherein $R_3$, $R_4$ and $R_5$ are as defined hereinabove; y is an integer between about 10 and 20,000, and z is an integer between about 1 and 4;

(iv)

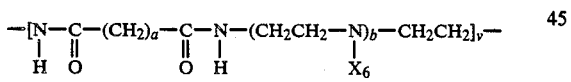

wherein $X_6$ in each polymer unit is independently selected from —CH$_2$CH(OH)CH$_2$OH, —CH$_2$CH(OH)CH$_2$Cl, or

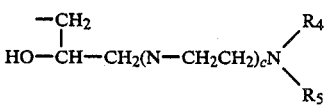

wherein v is between about 10 to 100,000, a is 6, b is 1 to 4, c is 1 to 4; and $R_3$, $R_4$ and $R_5$ are as defined hereinabove;

(vii)

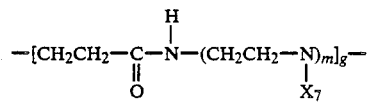

wherein $X_7$ in each polymer unit is independently selected from —H or a substituent selected from —CH$_2$CH(OH)CH$_2$OH, —CH$_2$CH(OH)CH$_2$Cl, or

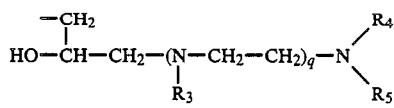

wherein m is an integer from 1 to 4, g is between 10 and 10,000, q and $R_3$, $R_4$ and $R_5$ are as defined hereinabove; or (viii)

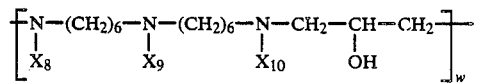

wherein $X_8$, $X_9$ and $X_{10}$ in each polymer unit are each independently selected from —H or a substituent selected from —CH$_2$CH(OH)CH$_2$Cl, —CH$_2$CH(OH)CH$_2$OH, or

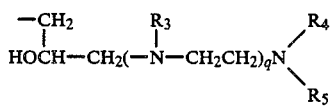

q, $R_3$, $R_4$ and $R_5$ are defined hereinabove, w is between about 10 and 10,000; or (ix) mixtures of polymeric chelates (i) to (viii); with the proviso that the overall ratio of —H, —OCH$_3$, —OCH$_2$CH$_3$, —Cl, or OH to substituent in each of $X_1$, $X_2$, $X_3$, $X_4$, $X_5$, $X_6$, $X_7$, $X_8$, $X_9$ or $X_{10}$ in each polymeric chelant (i to viii) hereinabove is between about 10/90 and 90/10, effective to oxidize the S$^=$ to elemental sulfur containing an oxidizing polyvalent metal and an oxidizing agent in an amount effective to continuously reoxidize the reduced polyvalent metal present;

(B) separating the gas stream and the resulting aqueous phase produced in step (A);

(C) removing the elemental sulfur from the aqueous phase separated in step (B);

(D) separating and purifying the organic polymeric chelate containing aqueous solution of produced in Step (C) by membrane means effective to remove water and low molecular weight materials having a molecular weight of less than 500 daltons; and (E) recycling the concentrated aqueous solution produced in step (D) to the contacting zone of step (A).

* * * * *